United States Patent [19]
Bourdel

[11] Patent Number: 5,810,975
[45] Date of Patent: Sep. 22, 1998

[54] APPARATUS FOR EXTRACTING SOLID RESIDUE FROM A FLUID BY EVAPORATION

[75] Inventor: Jacques Bourdel, Saint Martin d'Uriage, France

[73] Assignee: Sirven, Ploudaniel, France

[21] Appl. No.: 891,394

[22] Filed: Jul. 1, 1997

Related U.S. Application Data

[63] Continuation of Ser. No. 284,533, filed as PCT/FR93/00137 Feb. 10, 1993, abandoned.

[30] Foreign Application Priority Data

Feb. 12, 1992 [FR] France ................................ 92 01732

[51] Int. Cl.$^6$ ........................................................ B01D 3/00
[52] U.S. Cl. .......................... 202/176; 159/11.3; 159/12; 159/24.1; 202/197
[58] Field of Search ................................. 203/26, 40, 72, 203/89, 4, DIG. 8; 202/176, 236, 197, 265, 238, 175, 241; 159/11.1–11.3, 13.1–13.2, 24, 49, 12, 46, 42, 43.1; 222/243

[56] References Cited

U.S. PATENT DOCUMENTS

| | | | |
|---|---|---|---|
| 1,501,515 | 7/1924 | Testrup | 159/12 |
| 3,725,209 | 4/1973 | Rosa | 159/6.1 |
| 3,764,483 | 10/1973 | Tleimat | 159/11.3 |
| 3,890,205 | 6/1975 | Schnitzer | 202/236 |
| 4,321,106 | 3/1982 | Burkhard et al. | 159/13.4 |
| 4,504,361 | 3/1985 | Tlear et al. | 202/236 |
| 4,707,220 | 11/1987 | Feres | 202/236 |

FOREIGN PATENT DOCUMENTS

| | | |
|---|---|---|
| 2457839 | 12/1980 | France . |
| 043166 | 9/1982 | Germany . |
| 3119985 | 12/1982 | Germany . |
| 8300547 | 2/1983 | WIPO . |

*Primary Examiner*—Virginia Manoharan
*Attorney, Agent, or Firm*—McCormick, Paulding & Huber

[57] ABSTRACT

An apparatus for extracting solid residues from an aqueous slurry. The slurry is applied to the upper surfaces of disks that rotate in a hollow cylindrical vessel so that an evaporation enclosure is defined by the vessel and at least in part by the upper surfaces of the disks. Oscillating slurry dispensing arms are oriented radially relative to the axis of a hollow shaft that supports the disks. Slurry flattening rollers press the slurry on to these disk upper surfaces and slurry scraping means remove the residue from the rotating disk upper surfaces. Finally, a condensation enclosure is provided for removing liquid condensate from the vapor produced in the evaporation disclosure, and means is provided for eliminating non-condensable gases periodically from a condensation enclosure.

7 Claims, 8 Drawing Sheets

FIG_1

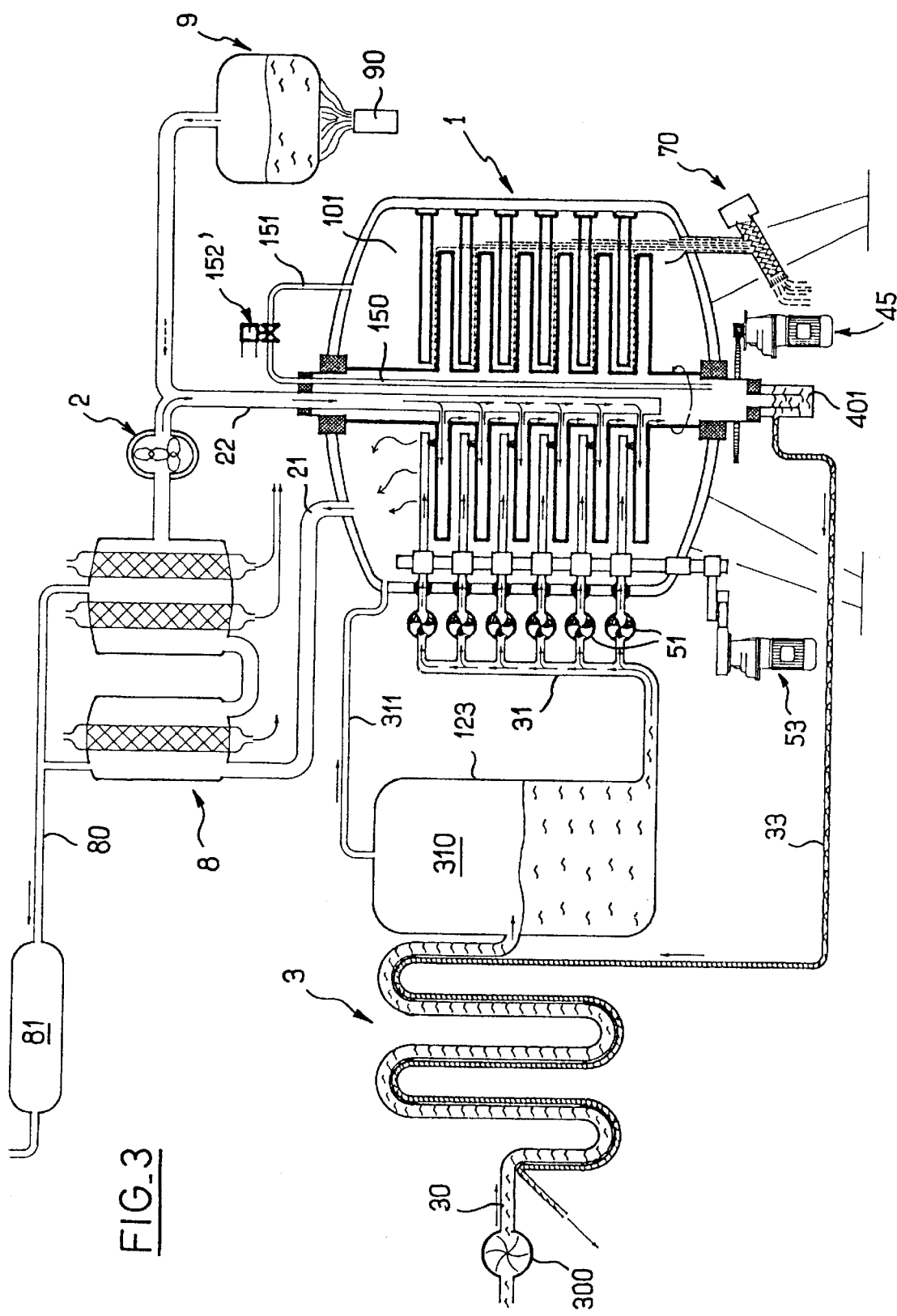
FIG_3

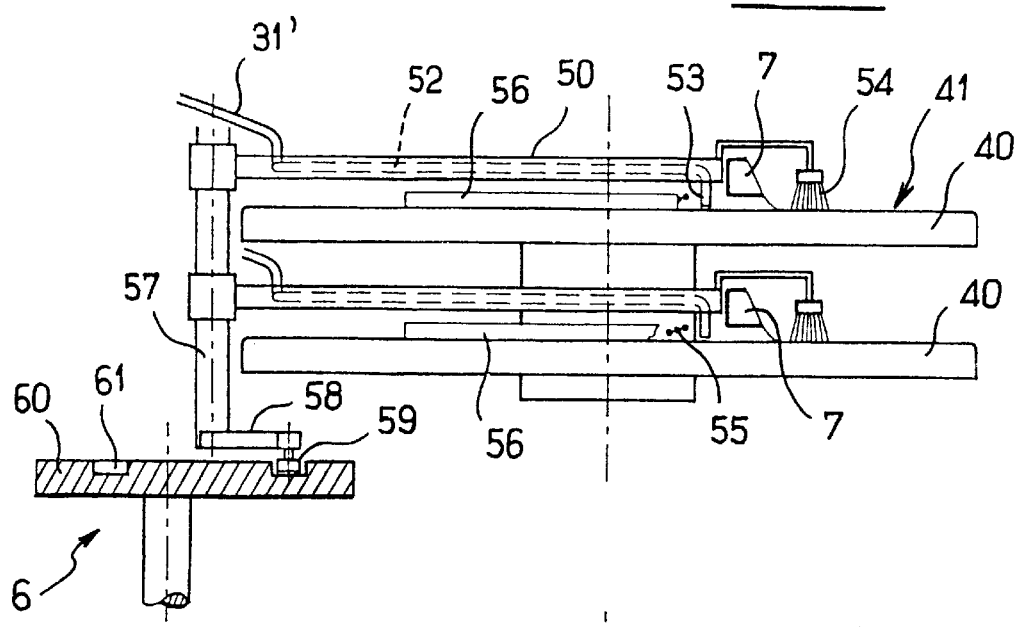
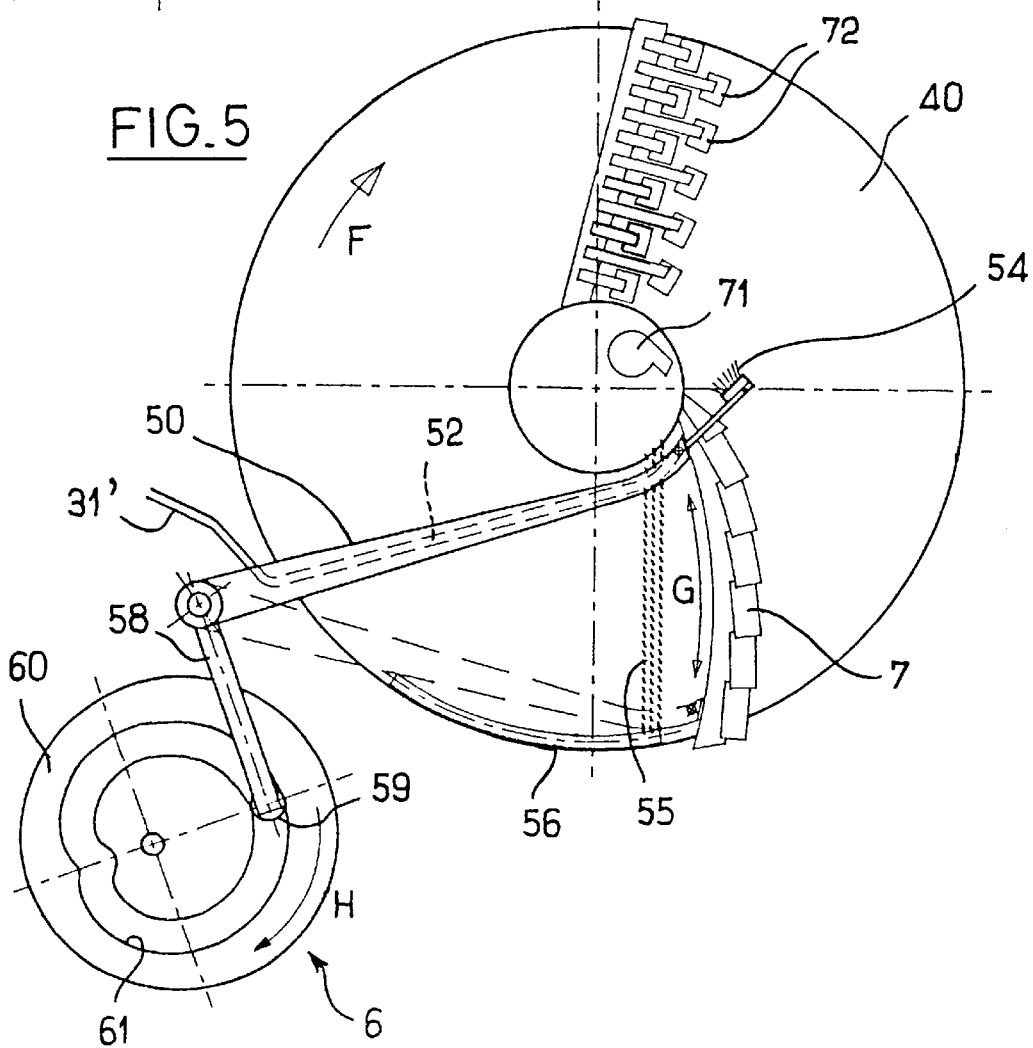

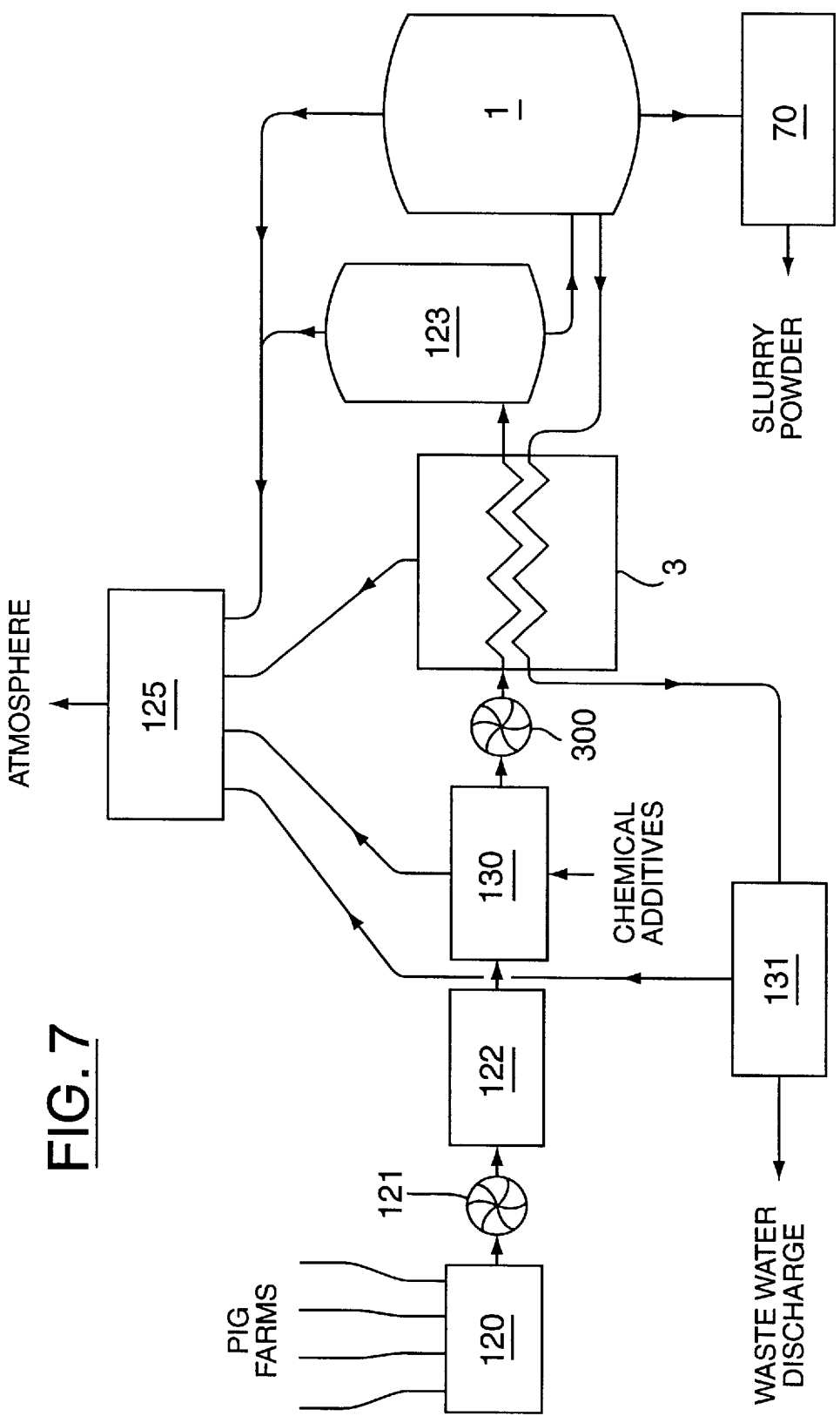

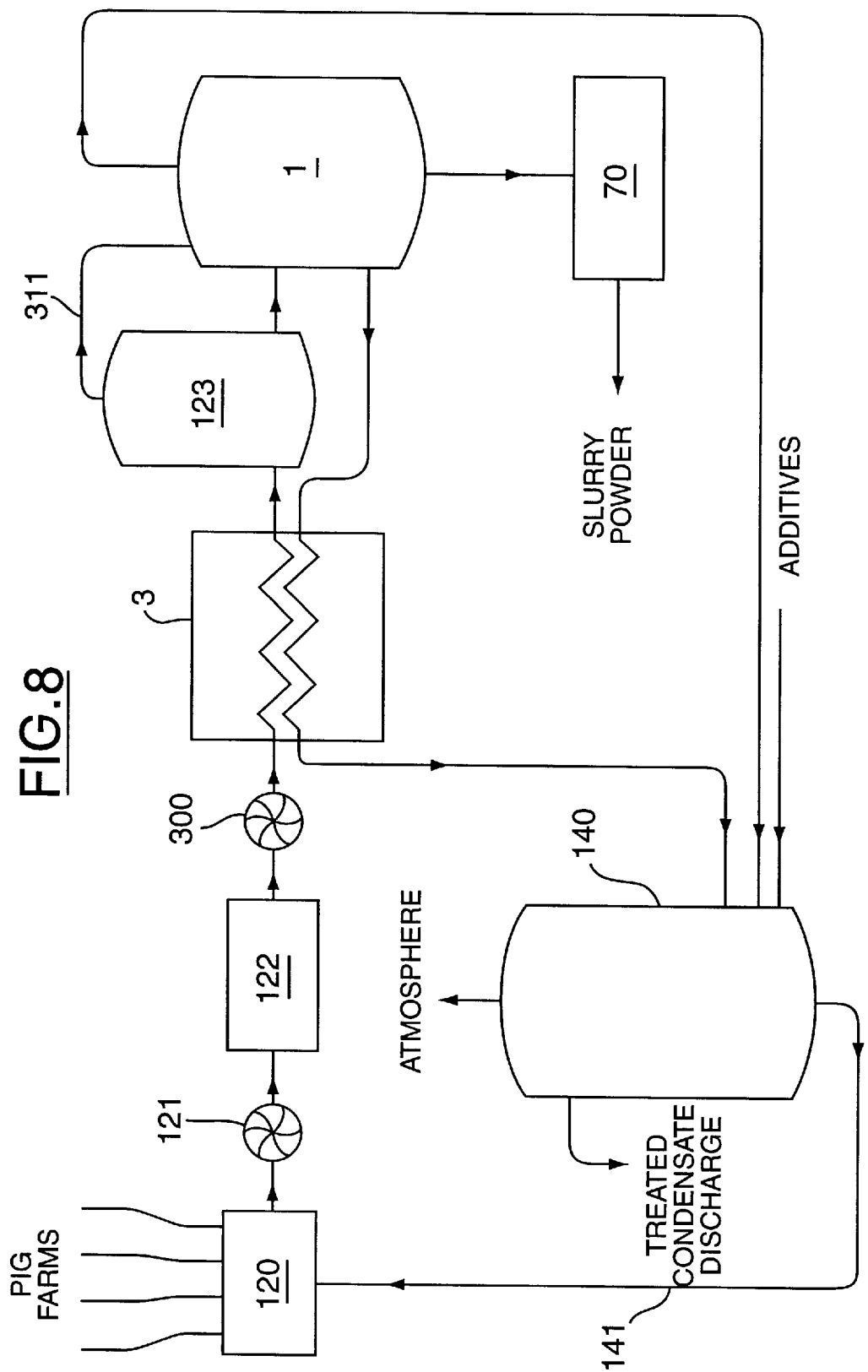

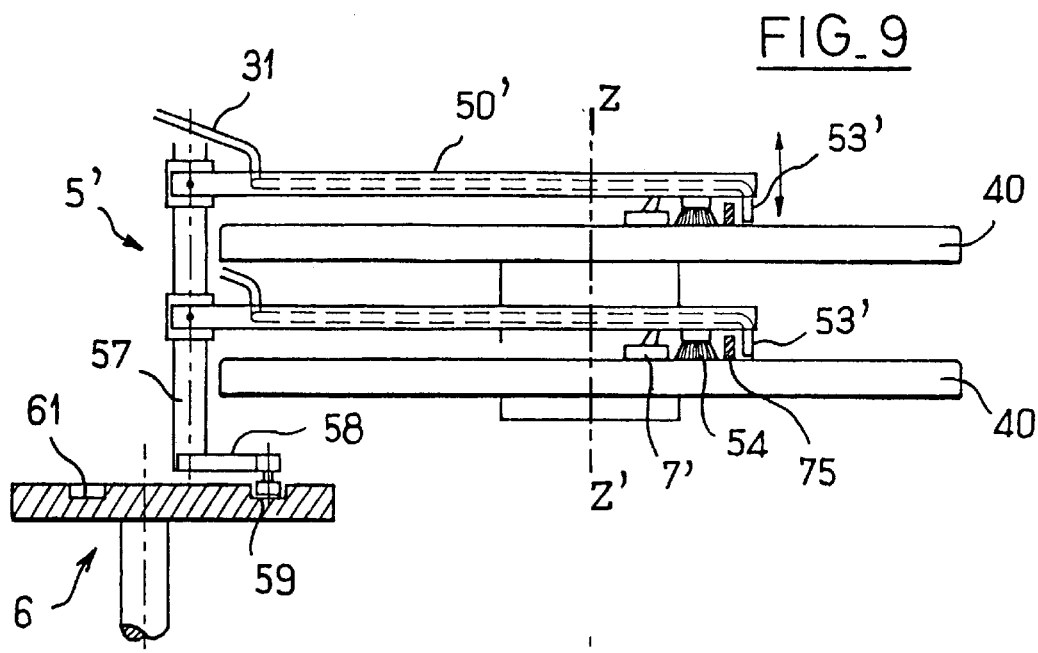
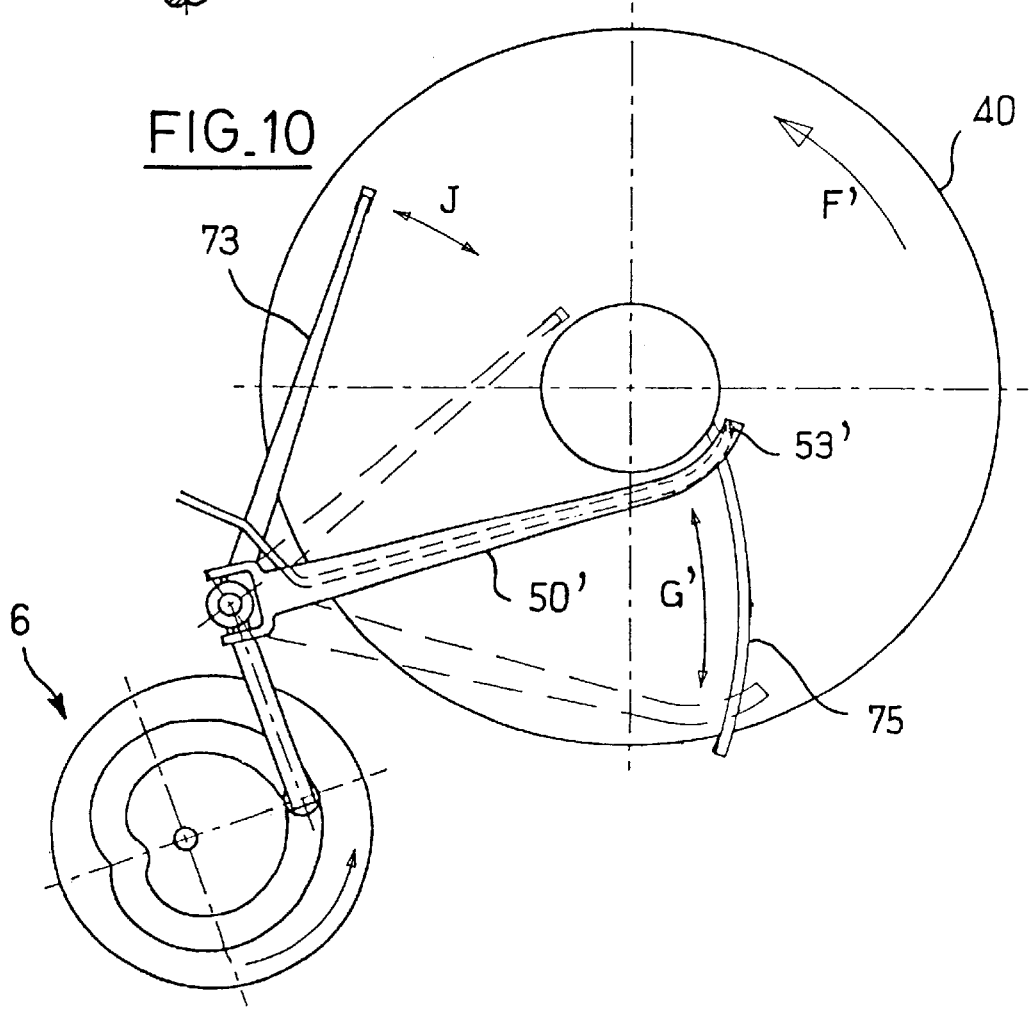

APPARATUS FOR EXTRACTING SOLID RESIDUE FROM A FLUID BY EVAPORATION

This is a continuation of application Ser. No. 08/284,533, filed as PCT/FR93/00137 Feb. 10, 1993 now abandoned.

The present invention relates to a method of extracting solid residues to be found in suspension or in solution in a fluid that contains volatile substances, and in particular aqueous substances. The invention also relates to a machine for implementing the method, and to a treatment installation fitted with such a machine.

The term "aqueous substance" is used to designate a substance containing essentially water, and the term "fluid" is used to designate a substance having the consistency of a liquid, a sludge, a paste, powder, or a granulate, and capable of flowing and spreading easily.

In numerous industrial and agricultural applications, the problem arises of treating aqueous fluids in such a manner as to separate therefrom the solids that are to be found therein in the form of a solution or in the form of particles in suspension in order to separate the solids from the water, and where appropriate from other liquids also present in the water, which water is subsequently discharged into the environment. The difficulties encountered in solving this object are mainly associated with the cost of treatment and with the need for liquids and gases discharged into the environment to be non-polluting.

This problem arises in particular in the treatment of animal slurries where it is necessary to expend very little energy.

The problem also arises, for example, in dehydrating liquid sludge from water works, be they urban or industrial, in dehydrating certain by-products, e.g. from slaughterhouses, that may be included in animal feed, and in a variety of substances in agribusiness.

A well known technique that is effective in separating the solid and liquid components of a suspension or of a solution is evaporation (or distillation). That technique makes it possible to obtain complete extraction of solid residues.

However, to evaporate the liquid using known methods, it is necessary to supply a considerable amount of heat, and as a result that technique is not cheap.

This applies, for example, to the method of treating slurry that is described in DE-C-3 615 873, whereby the slurry to be treated is contained in a vessel and is heated electrically. That technique enables the slurry to be concentrated but it does not enable the solid residue to be extracted in the form of a dry product (powder).

DE-A-3 043 166 describes a vacuum dryer which comprises a certain number of vertical parallel hollow disks that rotate within an enclosure. The fluid to be dried is sprayed from spray strips onto both faces of the disks and after drying it is scraped off so as to fall to the bottom of the vessel. In that apparatus, which operates under a vacuum, the vapors produced by the evaporation are pumped out from the enclosure. A heating agent coming from an external source of heat is injected into the disks in order to heat them (and give rise to the evaporation). That known technique is therefore likewise unsatisfactory from the cost point of view.

That is why the object of the invention is to make use of the evaporation technique with the help of a special arrangement that makes it possible to obtain a considerable reduction in the quantity of energy required.

The state of the art may be illustrated by documents WO-A-83 00547 and FR-A-2 457 839.

WO-A-83 00547 relates to drying damp substance, in particular vegetable matter, and it consists in causing the substance to be dried to advance over heater elements, e.g. by means of a conveyor screw. The vapor given off by the heated damp substance is recovered and recompressed by means of a motor driven compressor. It is this recompressed vapor that provides the heat-conveying fluid that feeds the heater elements.

That document discloses a technique of drying substances that can be put into the form of pellets, but not fluid substances containing solid residues in suspension such as slurry. Such a machine is not suitable for treating a fluid since the thermal contact between the damp substance and the heater elements is very poor, or indeed non-existent. The thickness of the damp substance and its poor thermal conductivity make it impossible to obtain a dry product at the outlet. Finally, it is wishful thinking to seek to recompress within the heater elements the vapor produced by drying the non-disengaged damp substance, given the presence of non-condensable substances.

FR-A-2 457 839 describes apparatus for distilling polluted water, likewise using the principle of recompressing the vapor produced by evaporation. The water to be treated is sprayed over a bundle of flat tubes within which the recompressed vapor is injected, and which condenses therein, thereby providing the heat required for evaporation.

That technique is not applicable to fluids containing a high content of solid residue in suspension, and particular to slurry, since the spraying of the tubes and the downflow of the substance under gravity along the tubes would take place in highly irregular manner. The solid residue would stick to the tubes, and would very quickly prevent the heat exchange necessary for evaporating the substance.

The various drawbacks of the known techniques are eliminated by the method of the invention because of the fact that the substance is applied continuously in the form of a thin and uniform layer of thickness lying in the range 0.2 mm to 2 mm on a "first" face of the two faces of a heat exchange wall, said wall being heated to a temperature sufficient for implementing rapid evaporation of the water and/or of the volatile components of the substance, with the dry solid residue thereof being continuously removed as it forms on said first face by scraping said face, and said heat exchange wall is heated by the vapor that results from the evaporation after said vapor has been mechanically compressed and then put into contact with the other "second" face of the wall in such a manner as to cause it to condense thereon, and the hot liquid condensate is removed therefrom, the non-condensible substances being eliminated prior to recompression of the vapor.

It will be understood that because of this arrangement, the quantity of heat given off on the second face when the steam condenses (an exothermal phenomenon) is transmitted by conduction through the heat exchange wall to the other face (the first face). This quantity of heat then serves to evaporate an equivalent volume of liquid to be found in the layer of substance to be treated that is in contact with said first face (an endothermal phenomenon).

In this way, the heat given off by condensation is recovered for evaporation, thereby making it possible to work with low energy input, corresponding substantially to the mechanical energy required for compressing the vapor.

It will also be understood that in order for said exchange to be capable of taking place in full or nearly in full, it is necessary for the heat exchange wall to be a very good conductor of heat and for the fluid substance that is to be treated to be spread in the form of a very thin layer, such that each particle of solid is in contact or practically in contact with the evaporation first face of the heat exchange wall.

This transfer of latent heat through the wall becomes possible providing the condensation pressure is a little greater than the evaporation pressure.

As an indication, the only energy that needs to be provided, i.e. the energy required for mechanical compression, is 20 times to 60 times smaller than the energy that would be necessary for achieving evaporation using a conventional method.

To further limit the heat input required, it is particularly advantageous to pre-heat the substance that is to be treated from the resulting hot condensate. Losses of heat are then very small.

As an indication, and when treating animal slurry, e.g. pig slurry, operation takes place at a pressure of about 1 bar and at a temperature of about 100° C. on the first face side (evaporation side), and at a pressure of about 1.4 bars and at a temperature of about 110° C. on the second face side (condensation face).

With slurry, it is also advantageous, or even necessary, to subject the slurry to de-foaming and/or to degassing before it is applied on the heat exchange wall.

The machine of the invention used for implementing the method comprises:

a heat exchange wall separating two enclosures from each other, an "evaporation" one of the enclosures being situated on the same side as the first face, while the "condensation" other enclosure is situated on the same side as the second face;

an applicator device for applying the substance to be treated in the form of a thin layer on said first face;

means suitable for extracting the vapor produced in the evaporation enclosure, for eliminating non-condensible substances therefrom, for purifying it, for compressing it, and for injecting the compressed vapor into the condensation enclosure;

means for recovering the dry solid residue that forms on said first face;

means for removing the liquid condensate that forms in the condensation enclosure; and means enabling non-condensible gases to be extracted periodically from the condensation enclosure.

In a particularly advantageous embodiment, said heat exchange wall is a moving wall and it describes cyclical motion over a closed trajectory, the substance to be treated being deposited on said wall at the beginning of a cycle while the solid residue is removed at the end of the cycle.

Preferably, a series of identical moving walls are provided that are driven synchronously, thereby multiplying the treatment capacity of the machine.

In which case, the machine advantageously includes a series of positive displacement pumps each suitable for dispensing the substance to be applied on a corresponding one of the moving walls. Consequently, each moving wall is associated with a positive displacement pump that dispenses the substance.

In a preferred embodiment, said heat exchange wall is one of the walls of a hollow disk rotating about its axis with the inside volume thereof constituting said condensation enclosure while the volume outside the disk constitutes the evaporation enclosure.

A cycle thus corresponds to a complete revolution of the disk.

In which case, it is possible to provide a series of hollow disks that are identical, coaxial, and parallel, and which are carried by a rotary tubular shaft whose inside volume communicates with the inside volume of each of the disks, said volumes (overall) forming the condensation enclosure.

Preferably, the tubular shaft is disposed vertically and it opens out at its base into a receptacle for receiving the liquid condensate.

In a preferred embodiment of the applicator device, said device comprises an oscillating dispensing arm.

When said arm is associated with a heat exchange wall in the form of a rotary hollow disk, the oscillating arm advantageously caries a duct for dispensing fluid and opening out in the proximity of the first face of the* disk, and its open end oscillates in a plane parallel to the first face in a direction that is approximately radial relative to the disk.

The oscillating arm may be driven simply by means of a cam mechanism, in which case the mechanism is organized so that application takes place with substance being applied at substantially constant thickness over the entire surface of the disk.

When a series of parallel disks is provided, each disk is naturally associated with a corresponding oscillating applicator arm; all of said arms then advantageously being driven by a common cam mechanism.

Dry solids are recovered by means of a scraper which bears against the first face of the moving wall. In one possible embodiment, the scraper is fixed. In another possible embodiment, the scraper is a moving scraper carried by an oscillating arm.

In addition, it is possible to provide the oscillating arm with a small brush that sweeps over the first face of the moving wall and that is adapted to expel certain residues towards the outside of the disk.

The machine is also advantageously provided with means suitable for encouraging the breaking up and the spreading out of the layer of substance, such as a series of crushing rollers that press against the substance to be dried while it is being transferred onto the moving wall and which are designed to make the layer of substance level while it is being treated so as to improve thermal coupling with said wall.

The installation that serves to implement the method of the invention and that includes a machine of the kind described above is fitted with a heat exchanger suitable for heating the substance entering the machine by means of the hot liquid condensate leaving the machine.

If the fluid is not very homogeneous, as is often the case with slurry, it is advantageous to provide a mechanical blending device upstream from the heat exchanger and a degassing and de-foaming device downstream from the heat exchanger.

Other features and advantages of the invention appear from the description and the accompanying drawings which show preferred embodiments. In the drawings:

BRIEF DESCRIPTION OF THE DRAWINGS

FIG. 3 is a diagrammatic overall view of a treatment installation fitted with the machine of FIG. 2;

FIG. 4 is a partially cutaway diagrammatic side view showing a pair of disks and associated applicator arms together with the cam drive system for said arms, these various members being fitted to the machine of FIG. 2;

FIG. 5 is a plan view of the elements shown in FIG. 4;

FIGS. 6, 7, and 8 are block diagrams of three installations for treating slurry using the method and the machine of the invention; and FIGS. 9 and 10 are views analogous to FIGS. 4 and 5 respectively, showing a variant of the applicator device.

DESCRIPTION OF THE PREFERRED EMBODIMENTS

Figure 1:
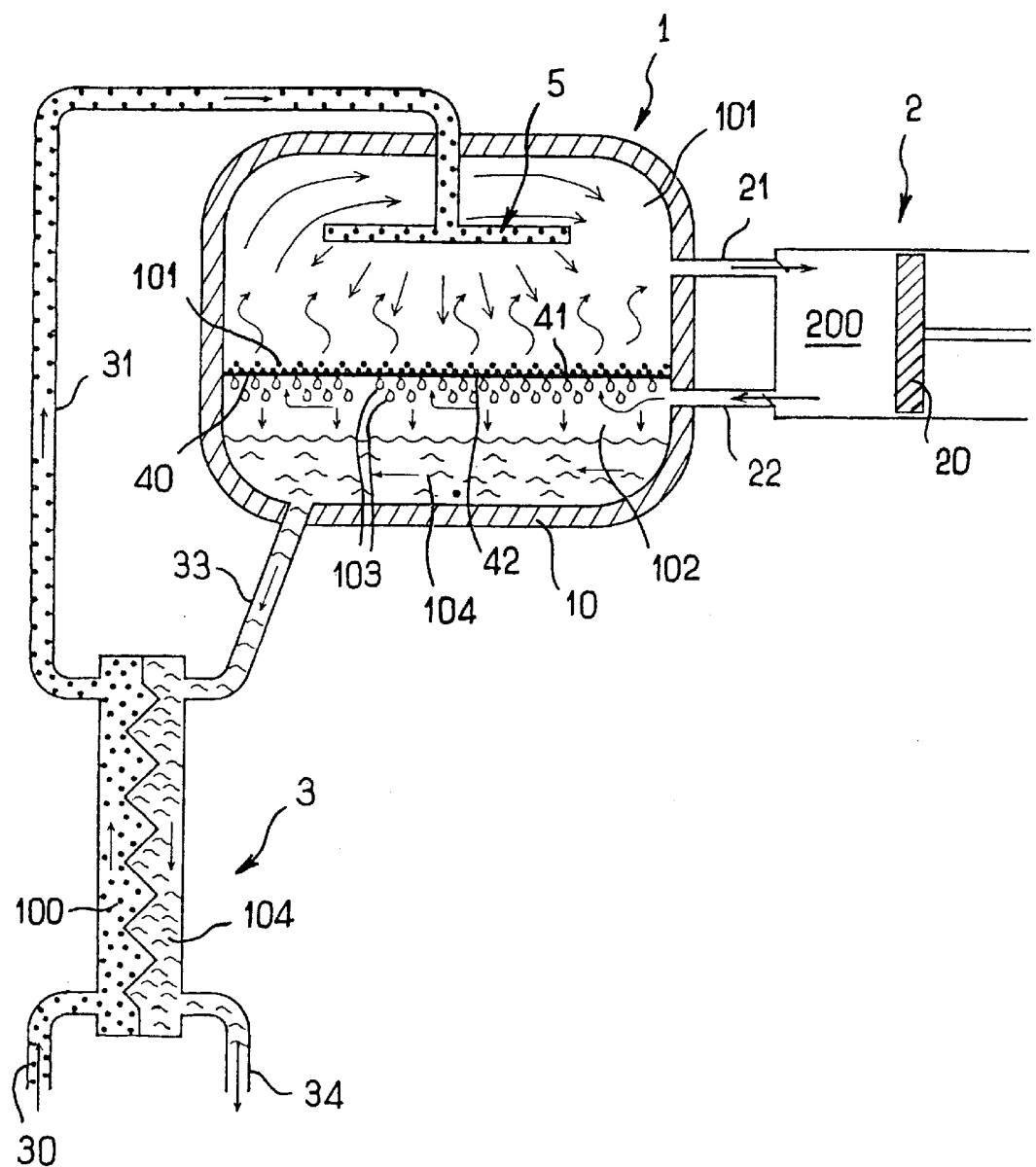
FIG. 1 is a theoretical diagram for making it easier to understand the thermodynamic processes and phenomena that are implemented in the method of the invention.

In the diagram of FIG. 1, the transfer of substance and the movement of various components during treatment are represented by small arrows.

The substance to be treated is given reference 100 and may be slurry from a pig farm. This is a fluid having the consistence of sludge and constituted by water containing solid particles in suspension and various substances in solution.

One or more pumps (not shown in the diagram of FIG. 1) serve to cause the substance to flow in the direction indicated by the arrows. The slurry 100 is conveyed by a duct 30 firstly into a heat exchanger 3. This heat exchanger may be of conventional type; its function is to heat the slurry passing therethrough by conveying heat thereto that is taken from a liquid 104 which also passes therethrough, but in the opposite direction. As explained below, this heat is provided by the liquid condensates 104 coming from the treatment machine, which machine is given reference 1.

As an indication, the slurry enters the heat exchanger 3 at a temperature of about +15° C., and it leaves the heat exchanger via a duct 31 at a temperature of the order of +100° C. The condensates penetrate into the heat exchanger via a duct 33 at a temperature of about 110° C. and they leave via a duct 34 at a temperature of about +25° C.

The machine 1 comprises a thermally insulated and sealed vessel 10 having a wall 40 disposed therein. The wall subdivides the space inside the tank into two enclosures 101 and 102 disposed respectively above and below the wall 40, the wall 40 being assumed to be horizontal, although that is not essential. The wall 40 is a thin plate of a material that is a good conductor, and preferably a metal.

The duct 31 opens out into the enclosure 101, and a device 5 (shown in highly diagrammatic form) is provided inside said enclosure for the purpose of continuously depositing the hot slurry on the top face 41 of the wall 40. A possible embodiment of the device 5 is described below. It is adapted to deposit and to spread the fluid slurry over the face 41 in the form of a uniform thin layer, of thickness lying in the range 0.2 mm to 2 mm.

Reference 2 designates a mechanical compressor of conventional type, e.g. comprising a piston 20 driven with reciprocating sliding motion. The compression chamber 200 of said compressor is in communication via ducts 21 and 22 with the enclosures 101 and 102 respectively. An appropriate set of valves is provided to allow gases to be admitted into the chamber 200 from the enclosure 101 and to shut off the duct 22 while the piston is being withdrawn, and also to allow gas to escape, once compressed, from the chamber 200 into the enclosure 102 while shutting off the duct 21, as the piston advances (i.e. moves to the left in FIG. 1).

As an indication, the pressure of the vapor inside the enclosure 101 is about 1 bar, whereas the pressure of the vapors inside the enclosure 102 is about 1.4 bars, with the compression ratio consequently being 1.4.

It is assumed below that the process described has already been started, and consequently that the slurry 100 penetrating into the machine is at 100° C. and that the condensates 104 leaving the machine are at 110° C.

The compressor 2 is driven by means that are not shown, e.g. by an electric motor.

The wall 40 has its top face 41 exposed to a temperature of 100° C., and has its bottom face 42 exposed to a temperature of 110° C. Since the wall is a good conductor of heat, and since it is thin (e.g. about 1 mm thick), it is consequently at an intermediate temperature.

This intermediate temperature is selected to cause vapor to be evaporated at a pressure of 1 bar and also to cause vapor to be condensed at a pressure of 1.4 bars.

Consequently, the water and other volatile liquids to be found in the layer of slurry in contact with the face 41 will evaporate progressively. Since the change from liquid phase to vapor phase is endothermal, heat is taken from the wall 40 during this process.

The resulting steam [the vapor is mostly steam], is subsequently compressed in the compressor 2 and injected into the lower enclosure 102. When the steam comes into contact with the bottom face 42 of the wall it condenses thereon. Since this is a change from vapor phase to liquid phase, i.e. an exothermal reaction, heat is given off to the face 42. By conduction through the thickness of the wall 40, heat is therefore transmitted to the other face, such that the energy required by one of the reactions is provided by the other. In theory, the only energy that needs to be provided is consequently that delivered to the compressor.

Drops of liquid condensate form on the face 42 and fall under gravity into the bottom of the tank 10 at a temperature of about 110° C. They then leave the tank via a duct 33 leading to the heat exchanger 104. After being cooled, they are removed via a duct 34.

It is important to remove solid residues continuously as they form on and adhere to the face 41 so as to replace them with new substance for treatment.

A machine enabling this object to be put into effect and enabling liquid slurry to be treated in an industrial manner is described below with reference to FIGS. 2, 4, and 5.

In these figures, elements that are similar or that correspond functionally to those described above are given the same references.

The machine 1 comprises a tank or vessel 10, it is in the form of a hollow body of revolution about a vertical axis ZZ' carried on a stand 11. The wall of the vessel 10 is sealed and is thermally insulated in a manner similar to a hot water cylinder.

A rotary body 3 is mounted inside the vessel 10 and is guided in rotation about the vertical axis ZZ'. The rotary body comprises a central tube 400 carrying a series of hollow disks 40. In the example shown, a stack of six hollow disks is provided with the inside volumes of the disks being in communication with the inside volume of the tube 400. The element 4 is manufactured in any appropriate manner. Thus, for example, each hollow disk may be formed by two disk-shaped plates that are spaced apart by a small distance and that are welded together around the periphery, the spacing between the two plates being optionally determined by a plurality of small spacers. Each plate has a central hole whose edge is welded to a ferrule, with the ferrules together forming the tube 400.

The tube 400 is guided in rotation within suitable sealed bearings mounted at the top and at the bottom of the tank 10.

The top plates constituting each of the disks 40 have respective horizontal upwardly facing outside faces that are plane and smooth. As explained below, it is these plates that act as heat exchange walls to perform the function described above.

Each hollow disk 40 is associated with a dispenser arm 50 forming a portion of the applicator device 5.

Each of the arms extends horizontally over the disk with which it is associated. The set of arms 50 is secured to a vertical shaft 57 that extends along the edge of the series of disks inside the tank 10. This shaft passes through the wall of the vessel where it is guided by means of a sealed bearing. It is driven with oscillating motion by means of a cam mechanism 6, i.e. it pivots back and forth about its own vertical axis.

As can be seen more clearly in FIGS. 4 and 5, the cam mechanism 6 comprises a horizontal cam turntable 60 in which a cam path 61 is formed. The cam is rotated with uniform continuous motion by an electric motor 53 and about an excentric vertical axis. The bottom end of the control shaft 57 carrying the arms 50 is secured to a crank 58 provided with a cam follower member 59 such as a small wheel engaged in the groove 61.

Due to rotation of the cam, the arm 50 is caused to describe reciprocating pivoting motion. In FIG. 5, solid lines are used to show the position of the arm 50 when it is closest to the center of the disk 40, whereas its position furthest from the center is represented by dashed lines. The free end of the arm consequently describes a trajectory that is in the form of an approximately radial circular arc.

The slurry feed duct 31 is connected to a series of positive displacement pumps 51 suitable for ensuring a constant and accurate slurry dispensing rate from the arm 50. Each pump 51 feeds an arm 50 and consequently a disk 40. In FIGS. 2, 4, and 5, reference 31' designates the slurry feed ducts leading from the positive displacement pumps 51. Each of these ducts is a flexible hose, allowing the applicator arm 50 to be displaced angularly. Each hose opens out into a channel 52 formed in the arm 50 and extending along the arm all the way to its free end. A dispenser endpiece 53 is provided at said free end facing downwards and opening out at a small distance (a few millimeters) above the top face 41 of the disk.

The assembly 4 is rotated about its axis ZZ' by an electric motor and gear box unit 45 whose outlet shaft has a gear wheel 44 meshing with a gear wheel 43 for speed reduction that is secured to the tube 400. Rotation takes place relatively slowly (0.1 to 1 revolution per minute, for example).

In the figures, the direction of rotation of the disks 40 and of the cam turntable 60 are symbolized by respective arrows F and H. The oscillating motion of the arm 50 is symbolized by arrows G.

A scraper 7 is disposed immediately upstream in the disk displacement direction of the free end of the arm 50 carrying the dispenser endpiece 53. The scraper is constituted by a series of inclined resilient blades carried by a fixed support (secured to the tank 10). The blades are disposed in a spiral configuration approximately following the path of the endpiece 53 while enhancing removal of residue. As explained below, the scraper member 7 is used for removing solid and dry residue from the disk and for directing it towards the outside of the disk where it can fall under gravity to the bottom of the vessel.

A series of crusher rollers 72 is disposed over an area of the disk situated on the opposite side of the disk axis from the area covered by the arm 50. The crushing rollers are small cylindrical rollers mounted to rotate freely about a horizontal axis disposed radially over the disk. The set of rollers is mounted on a fixed support, i.e. a support that is secured to the tank 10. Each roller is urged resiliently downwards so as to press against the disk with a certain amount of force, thereby enhancing breaking up and spreading out of the layer of substance transferred by the disk. In this respect, it should be observed that shortly after application, less-dry projections appear on the surface of the layer. These "damp" peaks need to be crushed and pressed against the hot face of the disk to finish off drying thereof.

A small brush 54 is fixed to the free end of the arm 50 and bears against the disk 40 immediately in front of the scraper means 7 (relative to the direction of rotation of the disk).

A device 55 is located a little behind the scraper members 7 (still relative to the disk displacement direction) and it serves to puncture the bubbles that form when the slurry is deposited on the disk. These invasive bubbles run the risk of forming foam that overflows from the disk.

The device 55 comprises a few thin metal wires which extend along radii immediately above the disks. The wires are held by insulating supports and they are electrically powered (from a source of electricity not shown) so as to be raised to a potential of several hundreds of volts relative to the potential of the disk. Thus, as soon as bubbles come into contact with the wires, they are immediately burst. When the wires become caked in splashes of slurry, the current flowing in the wires can be increased considerably so as to raise them to red heat, thereby pyrolizing the small residues covering them. Finally, it will be observed that in the central region of each disk there is a device 71 for injecting steam. The device is a small blower which is fed via appropriate ducts (not shown) with steam coming from the compressor. The steam escapes from the blower 71 at great speed and runs over an area of the disk where the solid residue is nearly dry, immediately before it is scraped off.

This makes it possible to improve final drying by raising the temperature of this sector a little due to the superheat energy (a consequence of any adiabatic compression).

Figure 2:
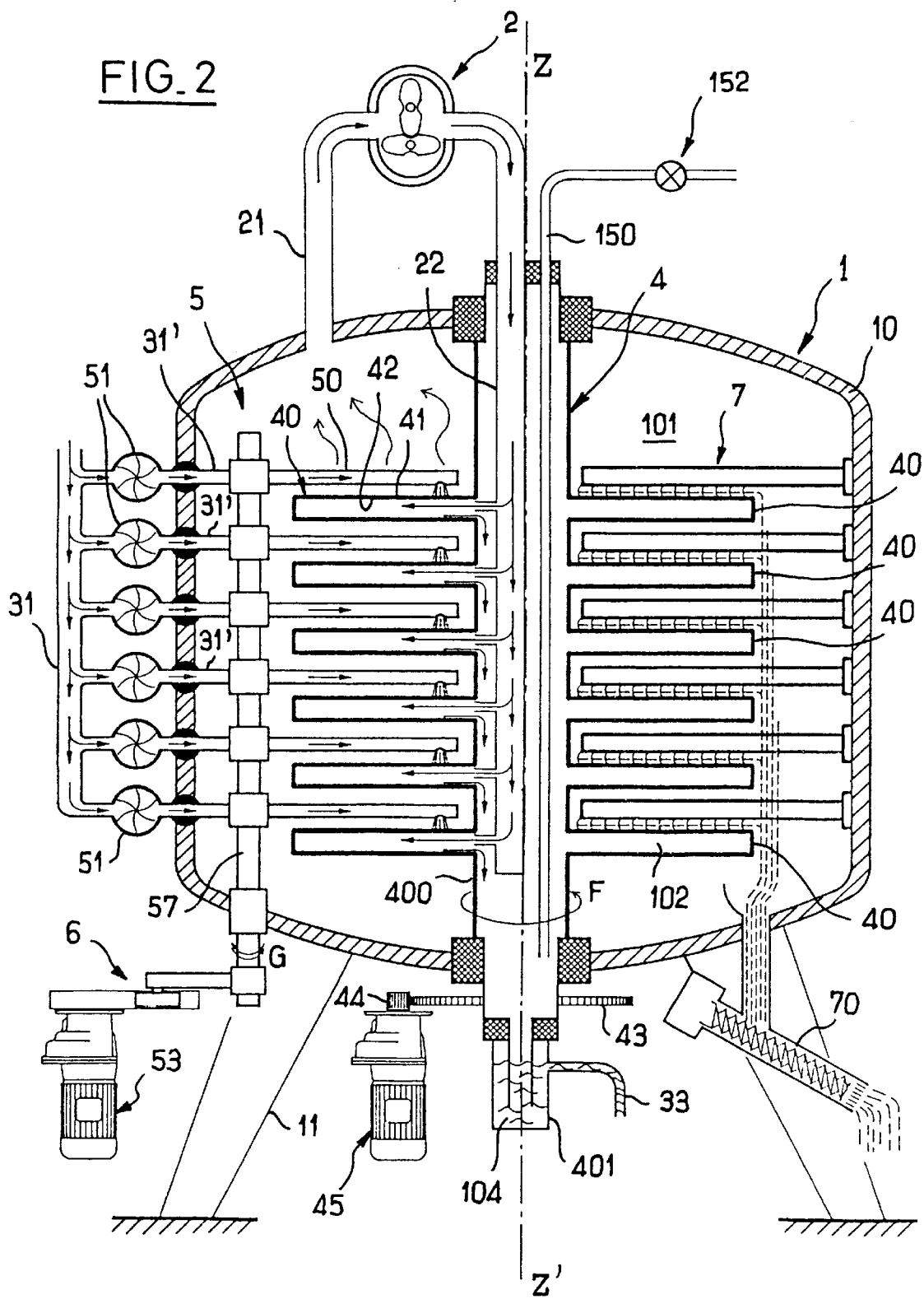
FIG. 2 is an axial section through a machine of the invention.

With reference to FIG. 2, the mechanical compressor 2 shown in the figure is a mechanical compressor of known type, having two rotary pistons that engage in each other. The duct 21 connected to the enclosure 101 corresponding to the inside volume of the tank 10 outside the series of disk 40 serves to convey steam from said enclosure to the compressor 2. The compressor compresses the steam and delivers it via a duct 22 to the inside of the enclosure 102, which enclosure correspond to the inside volumes of the tube 400 and of each of the disks 40.

Finally, the inside volume 102 communicates with the outside via a duct 150 that is normally closed by a valve 152, preferably an electrically-controlled valve, and that is used for venting the said enclosure, as explained below.

The device operates as follows.

It is assumed that the process has been started and that the conditions of temperature and pressure are the same as those described above with reference to FIG. 1.

Since the motors 45 and 53 are operating, the body 4 rotates at a slow speed about the vertical axis ZZ'. The set of arms 50 describes oscillating motion about a vertical axis corresponding to the axis of the shaft 57, with said angular back and forth motion being imparted thereto via the cam mechanism 6. Hot slurry arrives in each of the arms 50 at a constant rate imparted thereto by the corresponding positive displacement pump 51. This fluid slurry is deposited on the disk by the dispenser nozzle 53. Because of the combined displacement of the rotating disk and the sweeping movement of the arm 50, the fluid substance is deposited smoothly and uniformly over the entire surface of the disk in the form of a thin layer of accurately constant thickness, with said thickness being 0.5 mm, for example.

During one cycle, i.e. one revolution, each element of deposited substance is subjected to progressive evaporation of the water and other volatile components it contains. This evaporation is the result of the phenomenon already explained with reference to FIG. 1. About halfway through the cycle, the layer of substance is crushed and flattened by the series of presser rollers 72. The vapor that results from the evaporation and which is constituted for the most part by steam is raised to a pressure that is greater than the initial pressure, e.g. from 1 bar to 1.4 bars, by means of the compressor 2. This steam is conveyed into the inside of the rotary disks 40, and as already explained above, it condenses against the walls of said disks, thereby supplying them with an amount of heat that is equivalent to the amount that was required for evaporating the steam. The condensate which is essentially constituted by liquid water runs off under gravity into a receptacle 401 situated at the bottom of the tube 400. The speed of rotation of the disks is determined in such a manner that the substance transported by the disks has reached maximum dryness, or nearly, once it comes up to the scraper members 7. The substance is then made up solely of dry particles. These particles are unstuck from the disk by the scraper members. The small brush 54 pushes them towards the side of the disk. In this respect, it should be observed that the brush acts in one direction only and that it is active only when being moved from the center towards the outside of the disk. Means of simple design readily available to the person skilled in the art enable the brush to be retracted during its return stroke towards the center of the disk.

Naturally, the dry residue is collected in a suitable receptacle disposed at the bottom of the tank 10. A device 70 of conventional type, e.g. an auger, serves to crumble the particles and dispense them in the form of a relatively homogeneous powder or in the form of a granulate suitable for packaging, e.g. by bagging.

As already mentioned, the electric "bubble breaking" device 55 serves to fluidize as appropriately as possible the slurry at the moment when it is deposited on the disk, in such a manner as to form a uniform thin layer. The application of superheated steam by the blower 71 at the end of the cycle improves the dryness of the product obtained.

It may be observed that the outline of the path of the cam 61 is substantially heart-shaped, and is designed in such a manner that the density of the substance, i.e. the quantity of substance deposited per unit area, is identical at each point of the disk. Naturally, that results in a radial speed of displacement for the dispenser endpiece 53 that slows down progressively as said endpiece moves towards the outside of the disk (where the face of the disk moves past it faster).

The venting duct 150 enables residual non-condensable substances that remain inside the inner enclosure 102 to be periodically eliminated. These substances, and in particular carbon dioxide ($CO_2$) would otherwise run the risk of impeding the transfer of heat at the disks.

As an indication, a machine may be provided comprising a series of about fifteen superposed disks, each having a diameter of about 2 meters. The speed of rotation of the disks is about 10 to 15 revolutions per hour, and the period of oscillation of the applicator arm 50 is about 2 seconds. When working under the temperature and pressure conditions given above, it is then possible to use such a machine for treating about 0.5 m$^3$ of slurry per hour.

The machine 1 as described above, together with the compressor 2 fitted thereto are integrated in an installation as shown in FIG. 3.

In FIG. 3, reference 300 designates the pump for supplying cold slurry to the heat exchanger 3. The slurry has previously been subjected to mechanical blending so as to be thoroughly homogenized. Downstream from the heat exchanger 3 there is a device 123 for degassing and de-foaming the heated slurry. The function of this device is to eliminate the abundant foam that is created in the substance on being heated. The device 123 is not, properly speaking, part of the invention, and it may be a device that is known per se. It transforms substantially all of the bubbles into liquid which is blended in with the fluid, or else into gas. The resulting gas 310 is conveyed via a suitable duct 311 into the enclosure 101 of the machine.

In this installation, the steam given off inside the enclosure 101 passes through a separator and purifier assembly 8 prior to reaching the compressor 2. In addition to steam proper, the "steam" includes carbon dioxide ($CO_2$), ammonia ($NH_3$), and various volatile substances, in particular aromatic substances. The device 8 which may be of a type that is known per se performs physicochemical treatment of the steam. In particular, it eliminates non-condensable substances from the steam, i.e. carbon dioxide, various residual gases, a fraction of the volatile substances, and other smelly substances. In addition, it stops all of the ammonia and delivers it in the form of ammonium salts that are value as nitrogen-containing fertilizer. One of the effects of the separator-purifier is also considerably to reduce the concentration of organic substances that are responsible for the chemical oxygen demand (COD) of the raw distillate.

The device provides purified steam cleared of unwanted gases and thus easy to condense in the disks.

The unwanted gases are removed by a duct 80 and are discharged to the atmosphere after passing through a treatment device 81.

The purified steam is compressed by the compressor device 2 and is injected into the enclosure 102 of the machine, i.e. to the insides of the hollow disks.

In order to start the process up, a steam generator 9 is provided which is heated by a gas burner 90. This generator provides the inner enclosure with the steam required for heating the disks initially, thereby enabling the process to be started up. Naturally, once the treatment process has become self-sustaining, the auxiliary boiler 9 is no longer used.

The liquid condensate leaving the machine is cooled in the heat exchanger 3 and it leaves it in the form of water that is cold and purified, and suitable for river discharge in compliance with environmental standards.

In the installation described above, the separator-purifier assembly 8 serves in principle to retain the residual non-condensable substances. Nevertheless, in spite of all precautions taken at this point, it can happen that some such residual substances accumulate inside the disks and make them less effective or indeed ineffective. To prevent that, a cyclical venting system is provided by means of the electrically-controlled valve 152'. The gases leaving the enclosure 102 are then delivered to the enclosure 101, thereby limiting energy losses considerably. Thus, there is no danger of any residue impeding condensation on the insides of the disks.

The dry residue scraped off the disks is generally not compact. It is very bulky, having a relative density of the order of 0.3. To compact the residue, and to simplify handling thereof, it is advantageous either to grind it finely so as to obtain a powder, or else to transform it into granules. Storage of the powder or granules is then easy, e.g. in tanks or in bags, as is subsequent transport to locations of use.

Figure 6:
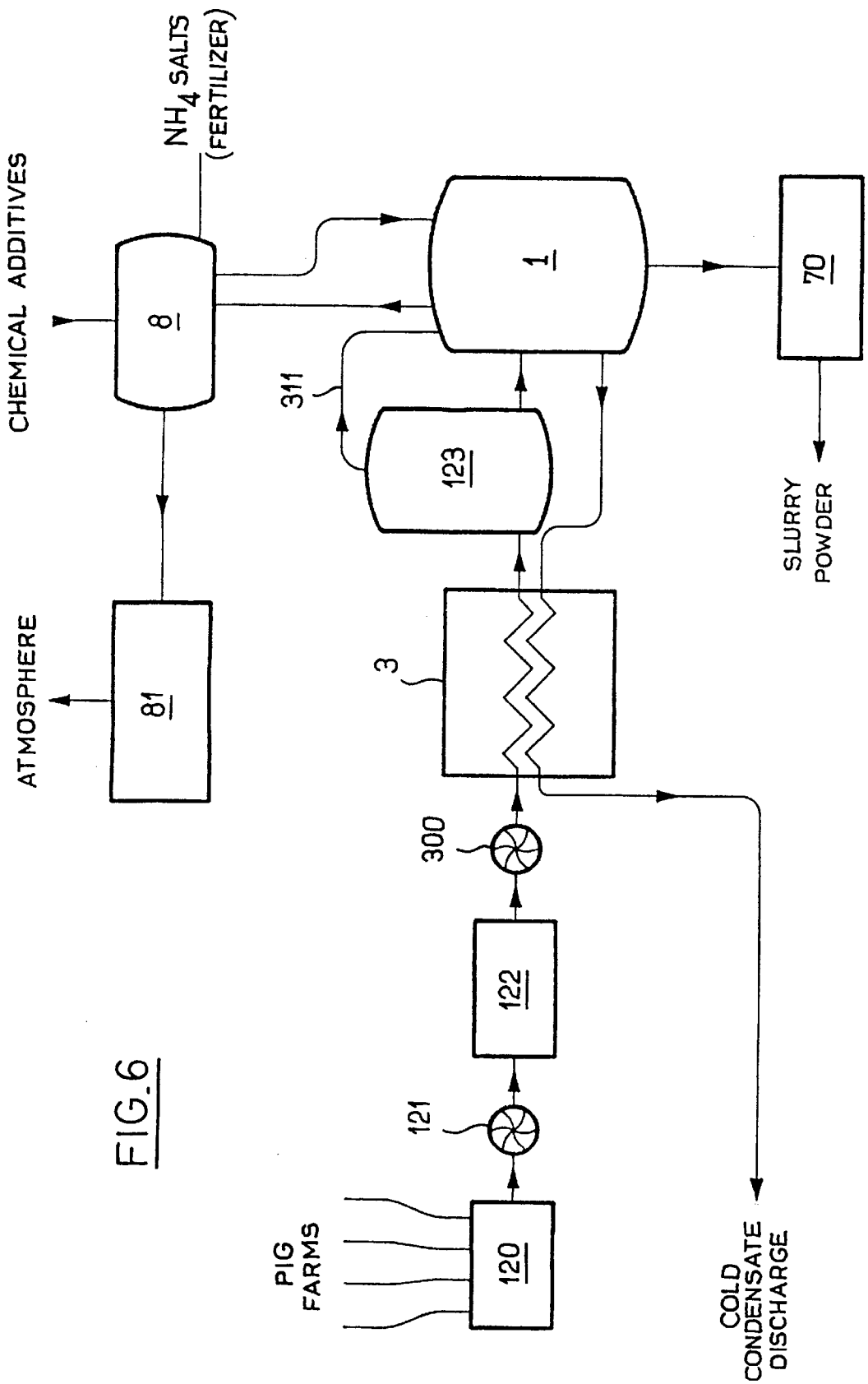

FIG. 6 is a block diagram of an overall installation that includes the installation of FIG. 3.

The slurry from pig farms is collected in a storage tank 120. Prior to treatment, a pump 121 delivers the slurry to a mechanical blender device 122 whose function is to homogenize and fluidize the substance. A pump 300 then transfers the substance to the treatment machine 1 via the heat exchanger 3 and the de-foamer/degasser 123. The steam is subjected to prior physicochemical treatment in the separator-purifier 8 which is supplied with appropriate chemical additives and which provides ammonia salts (fertilizer). After deodorization in the treatment device 81, the unwanted vapors are ejected into the atmosphere, while the steam proper is returned via the compressor (not shown in its figure) to the machine. The recovered dry slurry residue is collected and transformed into powder by the device 70. The water resulting from the condensation is discharged after cooling in the heat exchanger 3.

The installation shown likewise in the form of a block diagram in FIG. 7 differs from the preceding installation essentially by the fact that the chemical treatment is applied to the liquid slurry and not to vapors extracted therefrom. The treatment device, referenced 130, is inserted between the blending device 122 and the pump 300. Its function is essentially to extract carbon dioxide gas and various unwanted vapors from the slurry. In this configuration, it is necessary to treat the condensate water prior to river discharge. This is performed by a treatment device 131. The unwanted gases coming from the treatment devices 130, 131, the heat exchanger 3, the degassifier 123, and the evaporation enclosure of the machine 1 are treated and deodorized by an appropriate device 125 prior to discharge into the atmosphere.

In the installation shown in FIG. 8, the condensate is subjected to biological treatment. The entire process performed upstream from the machine 1 is identical to that performed by the installation of FIG. 6 with the exception that the various vapors given off are not treated. Treatment is performed downstream from the machine 1. Reference 140 designates a biological treatment device which may be of a type that is known per se. The device is supplied with appropriate additives. It receives the non-condensable discharge coming from the drying machine 1, which discharge contains, in particular, carbon dioxide gas and organic volatile substances. The device 140 also treats the cold condensate coming from the heat exchanger 3, which condensate contains, in particular, water, ammonia, and substances responsible for COD.

The function of the device is to produce nonpolluting condensates suitable for river discharge, and non-polluting gases suitable for discharge into the atmosphere. The sludge that results from the biological treatment is recycled via a duct 141, i.e. it is blended in with the slurry to be treated and to be dried.

FIGS. 9 and 10 show a possible variant of the means for applying substance to the disks. In these figures, items that are different but that perform functions similar to items in the embodiment of FIGS. 4 and 5 are given the same references, plus the "prime" symbol (').

The series of oscillating arms 50' is controlled in the same manner as in the preceding embodiment. This oscillation is under the control of a cam mechanism 6. It may be observed that the disk 40 rotates in the opposite direction to that shown in FIG. 5. The direction of rotation is indicated in FIG. 10 by arrow F'. A fixed barrier 75 is disposed immediately above the disk. This is a rod in the form of a circular arc that is substantially centered on the oscillation shaft 57 of the arm 50'. The barrier therefore extends in an approximately radial direction. It rubs slightly against the top face of the disk and its function is to separate in a precise manner the dry substance situated in front of the barrier from the recently applied fluid substance situated behind the barrier. Dispensing takes place via an endpiece 53' which is situated at the very end of the arm 50', behind the barrier.

The arm 50' is also provided with a scraper member 7' and with a small brush 54' which is optionally removable. These members are situated in front of the barrier 75 and are therefore suitable for outwardly expelling dry residue when it comes into this zone. Naturally, automatic declutching mechanisms are provided to render the scraper member 7' and the small brush 54' inoperative during the return stroke of the arm back towards the center of the disk. The barrier serves to retain residue that has not been wiped off during a stroke of the arm. A small pile of residue therefore builds up against the barrier, and this pile is wiped off during the next stroke.

Naturally, in this variant it is also possible to fit the disks with respective bubble bursters and blowers for superheating the substance prior to removal thereof.

In the variant of FIGS. 9 and 10, a second oscillating arm 73 is provided that is also carried by the shaft 57 and that is consequently driven by the cam mechanism 6 (double headed arrow J, FIG. 10). This arm is provided with one or more crushing rollers that run on the disk in order to flatten and level out the layer of substance that is in transit on the disk.

Within the technique constituting the subject matter of the present invention, it is possible to use various types of heat exchange surfaces.

Thus, the horizontal disks are particularly adapted for the treatment of non-uniform substances capable of settling and of foaming, where liquid slurry is a typical example of such a substance.

For substances that are uniform, that settle little, and that foam little, e.g. having the consistency of pancake batter, it is possible to use vertical disks. For coarse substances (of the manure, soil, etc. . . . type) it is possible to envisage using cylindrical surfaces. Finally, for granular substances having a low water content (e.g. wet sand, granulates, seeds, cereals) it would be possible to use tubular surfaces for heat exchange.

Nevertheless, it is important that the surface state of the heat exchange wall is very good, i.e. smooth and uniform.

It is also important to recall that the substance to be dried must be deposited as a fine and uniform layer in order to ensure that small localized temperature differences do not arise within the substance due, in particular, to Leidenfrost's phenomenon or to heat conduction phenomena within the dry residue. This precaution is essential for obtaining a residue that is thoroughly dry at low cost. Finally, it should be recalled that it is important for the pressure differences and for the temperature differences between the evaporation enclosure and the condensation enclosure to be as small as possible. Tests have shown that the compression ratio, i.e. the mean ratio between the condensation pressure and the evaporation pressure advantageously lies in the range 1.25 to 1.5. This makes it possible to obtain a product having 70% to 85% dry matter.

Depending on the application, evaporation temperatures may be lower or greater than the temperature of 100° C. that has been selected for treatment of farm slurry. As mentioned at the beginning of the description, the present technique can be used in numerous applications, not only in agriculture and agribusiness, but also in industry. If the water-containing substance to be treated is in the form of lumps, e.g. lumps of meat discarded by slaughterhouses, then prior to the treatment proper, pretreatment may be envisaged for fluidizing the substance, which pretreatment may comprise blending the lumps and adding water to them. This provides a fluid substance capable of flowing easily along the ducts and through the pumps of the installation, and of being deposited in the form of a thin layer on the heat exchange walls.

I claim:

1. Apparatus for extracting solid residues from an aqueous slurry in which the residues are suspended in solution, said apparatus comprising:

a hollow cylindrical vessel having an outer wall and defining an evaporation enclosure therewithin, an axially oriented hollow shaft assembly supported for rotation on the vertical axis of said vessel and including a plurality of generally radially oriented and axially spaced horizontally arranged hollow disks, said shaft assembly and disks cooperating to define a condensation enclosure sharing a common boundary that includes the upper surfaces of said disks, slurry applying means provided in said evaporation enclosure and including slurry dispensing devices adjacent said disk upper surfaces, said slurry dispensing devices including dispenser arms that oscillate generally radially relative to the vertical axis of said shaft assembly and relative to the upper surfaces of the disks, said dispenser arms corresponding in number to the number of said disks upper surfaces, a common shaft oriented vertically inside the vessel and arranged parallel to but spaced from the vertical axis of said shaft assembly and means for oscillating said common shaft, means for conveying slurry to the slurry applying means, slurry flattening rollers for pressing the slurry onto said disk upper surfaces, slurry scraping members for removing residue from said disk upper surfaces, means for rotating said shaft assembly slowly about its vertical axis, means for extracting vapor produced in the evaporation enclosure and for compressing the vapor and for reinjecting the compressed vapor into the condensation enclosure, means for removing liquid condensate from the condensation enclosure, and means for eliminating non-condensable substances from the vapor produced in the evaporation enclosure before it's recompression, and means for enabling non-condensable gases to be extracted periodically from said condensation enclosure.

2. Apparatus according to claim 1, wherein said slurry scraping members are fixed inside said vessel.

3. Apparatus according to claim 1, wherein said shaft assembly is of tubular configuration open at its base, said condensation enclosure being partially defined by said hollow tubular shaft.

4. Apparatus according to claim 1, wherein said means for applying the slurry includes a series of positive displacement pumps.

5. Apparatus according to claim 1, further, comprising a heat exchanger for heating the slurry from hot liquid condensate extracted from the condensation enclosure.

6. Apparatus according to claim 5, further comprising a mechanical blender situated upstream from the heat exchanger and a degassing and defoaming device situated downstream thereof.

7. Apparatus according to claim 6, wherein said degassing and defoaming device include an enclosure provided in communication with said evaporation enclosure.

* * * * *